US008396685B2

(12) United States Patent
Mahajan

(10) Patent No.: US 8,396,685 B2
(45) Date of Patent: Mar. 12, 2013

(54) SMALL FORM-FACTOR DISTANCE SENSOR

(75) Inventor: Manish Mahajan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 409 days.

(21) Appl. No.: 12/560,176

(22) Filed: Sep. 15, 2009

(65) Prior Publication Data

US 2011/0066399 A1    Mar. 17, 2011

(51) Int. Cl.
G01B 5/02    (2006.01)
(52) U.S. Cl. ........... 702/159; 702/57; 702/150; 702/189
(58) Field of Classification Search ............... 702/57, 702/150, 159, 189; 356/3, 482, 614; 340/870.01
See application file for complete search history.

(56) References Cited

U.S. PATENT DOCUMENTS

| | | | |
|---|---|---|---|
| 3,010,019 A | 11/1961 | Sohst | |
| 3,194,108 A | 7/1965 | Gunther | |
| 3,530,468 A | 9/1970 | Hannan | |
| 4,484,069 A | 11/1984 | Brenholdt | |
| 5,198,877 A | 3/1993 | Schulz | |
| 5,487,669 A | 1/1996 | Kelk | |
| 5,903,235 A | 5/1999 | Nichols | |
| 7,012,738 B1 * | 3/2006 | Schwarte | 359/325 |
| 7,130,034 B2 * | 10/2006 | Barvosa-Carter et al. | 356/141.1 |
| 7,180,607 B2 * | 2/2007 | Kyle et al. | 356/614 |
| 7,225,548 B2 * | 6/2007 | Sieracki et al. | 33/267 |
| 7,285,793 B2 * | 10/2007 | Husted | 250/577 |
| 2002/0145724 A1 | 10/2002 | Wursch et al. | |
| 2003/0098973 A1 | 5/2003 | Schmidt et al. | |
| 2005/0035314 A1 | 2/2005 | Yamaguchi | |
| 2006/0201006 A1 | 9/2006 | Burlingham et al. | |
| 2007/0121096 A1 | 5/2007 | Giger et al. | |
| 2007/0237424 A1 | 10/2007 | Burg et al. | |
| 2008/0088817 A1 | 4/2008 | Skultety-Betz et al. | |
| 2011/0061251 A1 | 3/2011 | Mahajan | |

FOREIGN PATENT DOCUMENTS

| | | |
|---|---|---|
| DE | 19836812 A1 | 2/2000 |
| DE | 102005048013 A1 | 4/2007 |
| EP | 1008831 A1 | 6/2000 |
| WO | WO03062744 A1 | 7/2003 |
| WO | WO2008003436 A1 | 1/2008 |

OTHER PUBLICATIONS

International Search Report and Written Opinion—PCT/US2010/048983, International Search Authority—European Patent Office—Mar. 2, 2011.

* cited by examiner

Primary Examiner — Michael Nghiem
Assistant Examiner — Elias Desta

(57) ABSTRACT

The subject matter disclosed herein relates to determining a distance from a mobile device to a remote object or a size of the remote object. An embodiment of the disclosure rotates a rotatable micro-reflector to direct energy toward a remote surface, said rotatable micro-reflector disposed in a mobile device, wherein said rotating is relative to said mobile device. An embodiment of the disclosure further measures a distance based at least in part on reflected energy from said remote surface resulting from said directed energy.

38 Claims, 13 Drawing Sheets

SMALL FORM-FACTOR DISTANCE SENSOR

BACKGROUND

1. Field

The subject matter disclosed herein relates to determining a distance from a mobile device to a remote object or a size of the remote object.

2. Information

A device may measure a distance to a remote surface by measuring a propagation time of sound, light, infrared (IR) and/or radio-frequency (RF) energy projected to the surface and reflected back to the device. For example, a hand-held device may project a light beam toward a surface several meters away to measure its distance. Unfortunately, an angle at which such a device is aimed at the surface typically affects a distance measurement. Additionally, such a device typically measures a distance to a point on the surface at which the device is aimed, which is not necessarily the closest point on the surface to the device.

BRIEF DESCRIPTION OF THE FIGURES

Non-limiting and non-exhaustive features will be described with reference to the following figures, wherein like reference numerals refer to like parts throughout the various figures.

SUMMARY

In one particular implementation, a method comprises rotating a rotatable micro-reflector to direct energy toward a remote surface, wherein the rotatable micro-reflector may be disposed in a mobile device, and wherein the rotating is relative to the mobile device; and measuring a distance based at least in part on reflected energy from the remote surface resulting from the directed energy. It should be understood, however, that this is merely an example implementation and that claimed subject matter is not limited to this particular implementation.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

In an implementation, a handheld device, such as a cellular phone, PDA, and the like, may include a distance sensor to determine a closest distance to a remote surface. For example, such a distance sensor may include an emitter and a receiver to emit and receive sound, light, IR and/or RF energy, a time module to determine a propagation time of the emitted energy as it travels to and from the remote surface, and a processor adapted to determine distances to multiple points on the surface. In particular, such a distance sensor may determine the closest, or shortest, distance among multiple determined distances to the surface. Additionally, such a distance sensor may have a sufficiently small form factor in order to fit in a handheld device such as a cellular phone or PDA, for example. In a particular implementation, a distance sensor may be capable of emitting sound, light, IR and/or RF energy along multiple angles. Individual angles may respectively correspond to particular distance measurement points on the remote surface. Determining distances to the remote surface along individual angles may yield multiple distance measurements. The shortest distance among such measurements may correspond to the shortest distance to the remote surface, as explained in further detail below. Such an implementation may be useful, for example, if a handheld device that includes a distance sensor making such distance measurements is held at a skewed angle towards a remote surface. In this case, a distance measurement along only the skewed angle may not necessarily comprise the shortest distance to the remote surface. This idea is discussed in reference to FIGS. 1A and 1B below.

Figure 1A:
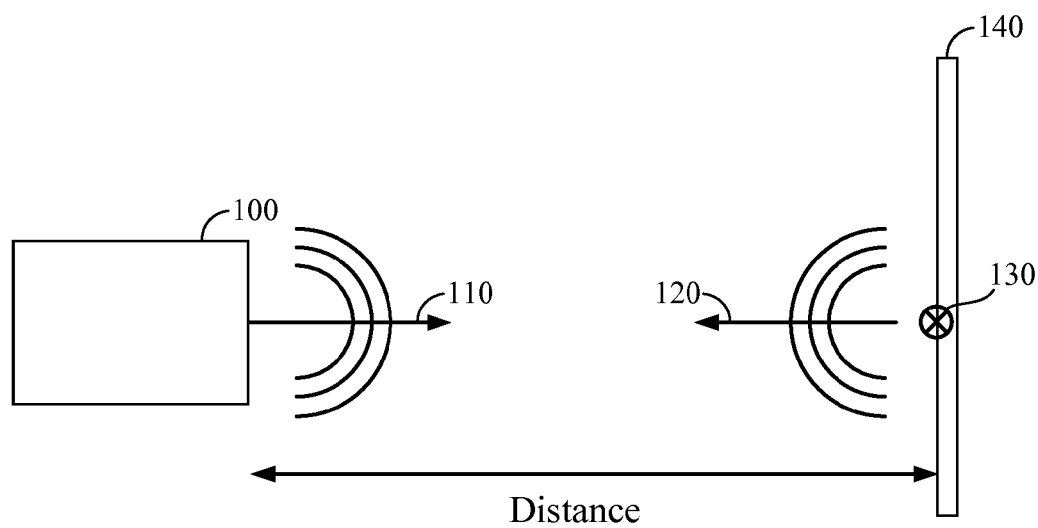
FIG. 1A is a schematic diagram showing a distance sensor to measure a distance to a surface, according to an implementation.
Figure 1B:
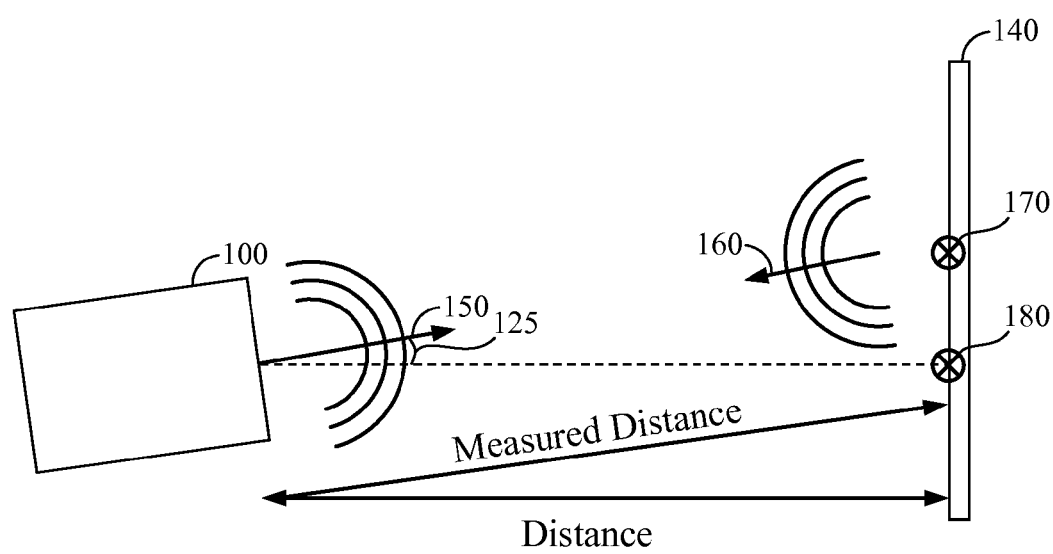
FIG. 1B is a schematic diagram showing a distance sensor held at an angle relative to a surface of which a distance may be measured, according to an implementation.

FIG. 1A is a schematic diagram showing a distance sensor 100 to measure a distance to a surface 140, according to an implementation. Such a distance sensor may be disposed in a handheld device, such as a cell phone for example, as mentioned above. In one particular implementation, distance sensor 100 may transmit and receive sound energy comprising substantially directed sound waves having subsonic or supersonic frequencies. In another particular implementation, distance sensor 100 may transmit and receive electromagnetic (EM) energy comprising RF radiation, and/or laser light having visible or IR wavelengths. Of course, such descriptions of sound and EM energy are merely examples, and claimed subject matter is not so limited. Distance sensor 100 may emit such energy 110 toward a point 130 on surface 140. Energy 110 may comprise a pulse of energy, e.g., a relatively short wave-train of sound and/or EM energy having a begin and end time. Such a pulse may be encoded, for example, to provide a means for distinguishing multiple received pulses from one another. Subsequently, energy 120 reflected from surface 140 may travel back to distance sensor 100, where a measurement of time elapsed between emission and reception at the receiver may be performed. Such an elapsed time may be referred to as propagation time. Using knowledge of the speed of sound and/or EM energy emitted and received by the distance sensor and the measured propagation time, a distance from the distance sensor to the remote surface may be determined. As shown in FIG. 1B, distance sensor 100 may be held at a skewed angle 125 relative to surface 140. For example, such an angle may not be perpendicular to remote surface 140. At such an angle, distance sensor 100 may emit energy 150 at point 170 on surface 140, though point 180 may be the closest point of surface 140 to distance sensor 100. Accordingly, emitted energy 150 and reflected energy 160 along angle 125 may travel a greater distance relative to a distance to and from closest-point 180. Unfortunately, a resulting measured distance to surface 140 may then be greater than the closest distance to surface 140. In a particular implementation, a user may operate such a distance sensor disposed in a handheld device at a skewed angle without being aware of such a skewed angle, since even relatively small skewed angles that are difficult to observe may introduce substantial distance measurement errors. In another particular implementation, a distance sensor may be capable of emitting sound and/or EM energy along multiple angles so that a closest distance to a remote surface may be determined whether or not the distance sensor is held at a skewed angle to the surface, as discussed in detail below.

Figure 2:
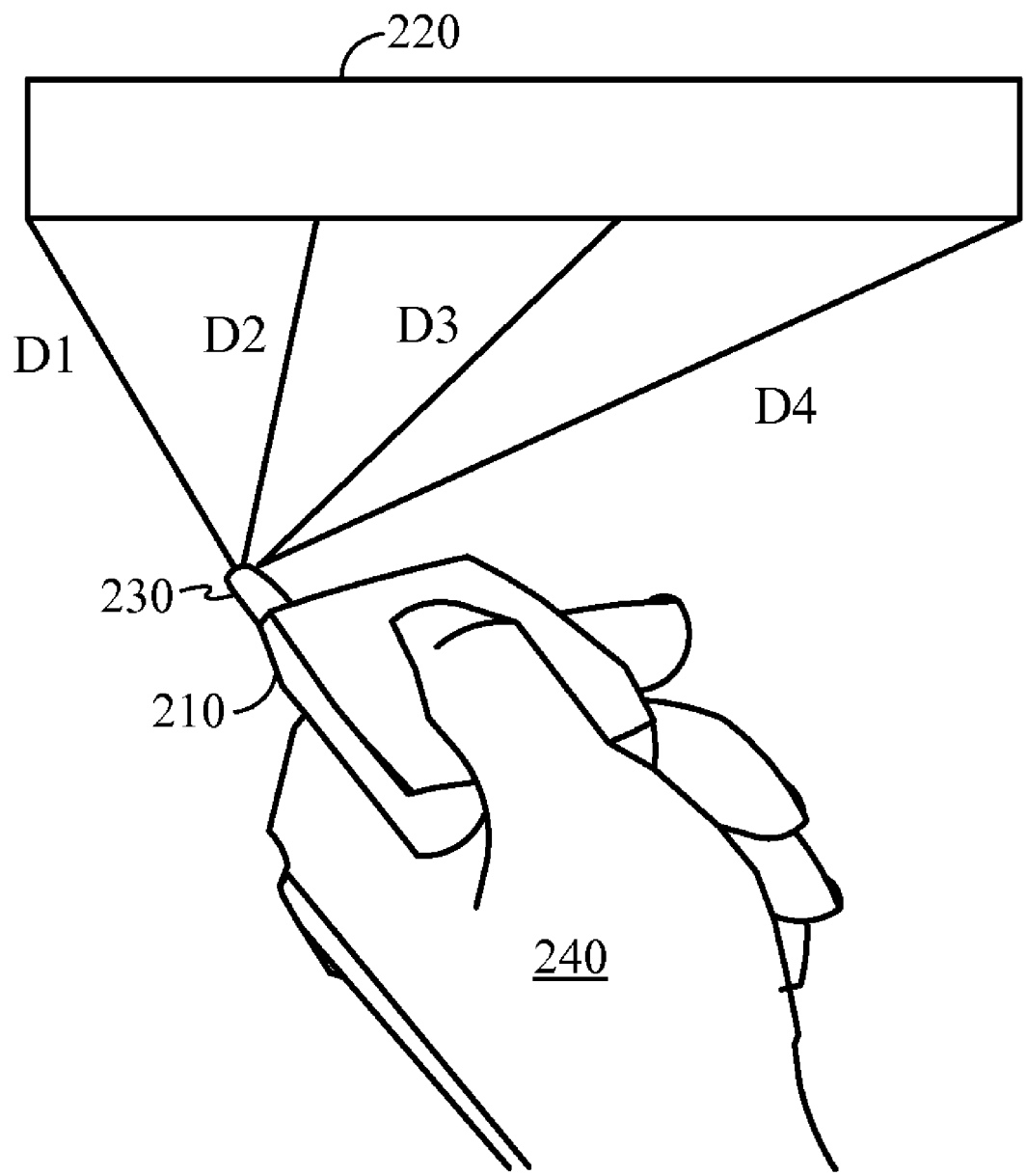
FIG. 2 is a diagram depicting a handheld device measuring several distances to a surface, according to an implementation.

FIG. 2 is a diagram depicting a handheld device 210 measuring several distances to a surface 220, according to an implementation. Handheld device 210 may comprise a cell phone, a PDA, and the like, and include a distance sensor 230. Such a distance sensor, as mentioned above, may have a small form factor to enable the distance sensor to fit in handheld device 210 As shown in FIG. 2, such a distance sensor 230 may emit sound and/or EM energy along multiple angles toward multiple distance measurement points on surface 220. In a particular implementation, distance sensor 230 may include one or more rotatable micro-reflectors mounted on a semiconductor device. Such rotatable micro-mirrors, which are explained in more detail below, may provide the small form factor mentioned above, for example. Of course, such a description of a distance sensor in conjunction with handheld device 210 is merely an example, and claimed subject matter is not so limited. In an example, a user 240 may inadvertently hold handheld device 210 at a skewed angle toward surface 220 to direct an energy beam D1 at surface 220. However, energy beam D1 may not be directed toward a point on surface 220 that is closest to the handheld device 210, so that a resulting distance measurement may be greater than such a measurement to the closest point.

In a search for such a distance to the closest point, distance sensor 230 may then redirect an energy beam D2 to another point on surface 220 to measure a distance to surface 220 along the direction of energy beam D2. Such a redirecting process may continue such as for energy beams D3 and D4, for example. After such a process, distance sensor 230 may have measured multiple distances to surface 220 along multiple directions. Accordingly, the shortest measured distance may correspond to the shortest distance to surface 220. In a particular implementation, accuracy of measuring the shortest distance to a surface may be improved by increasing the number of distance measurements to the surface while redirecting energy beams through smaller angles, as discussed below in more detail. Of course, such processes of a distance sensor are merely examples, and claimed subject matter is not so limited.

Figure 3:
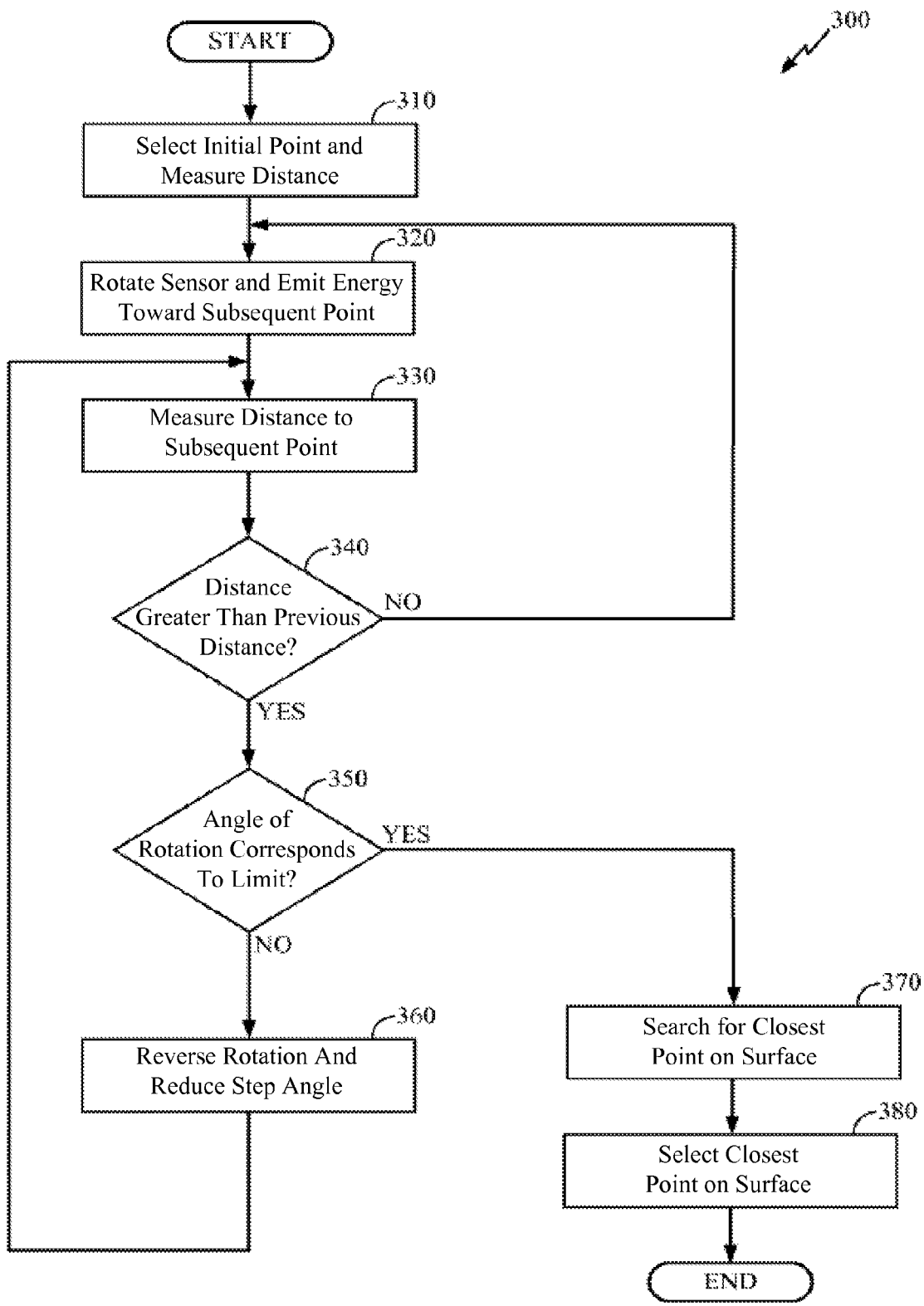
FIG. 3 is a flow diagram of a process for determining a shortest distance to a surface, according to an implementation.
Figure 4:
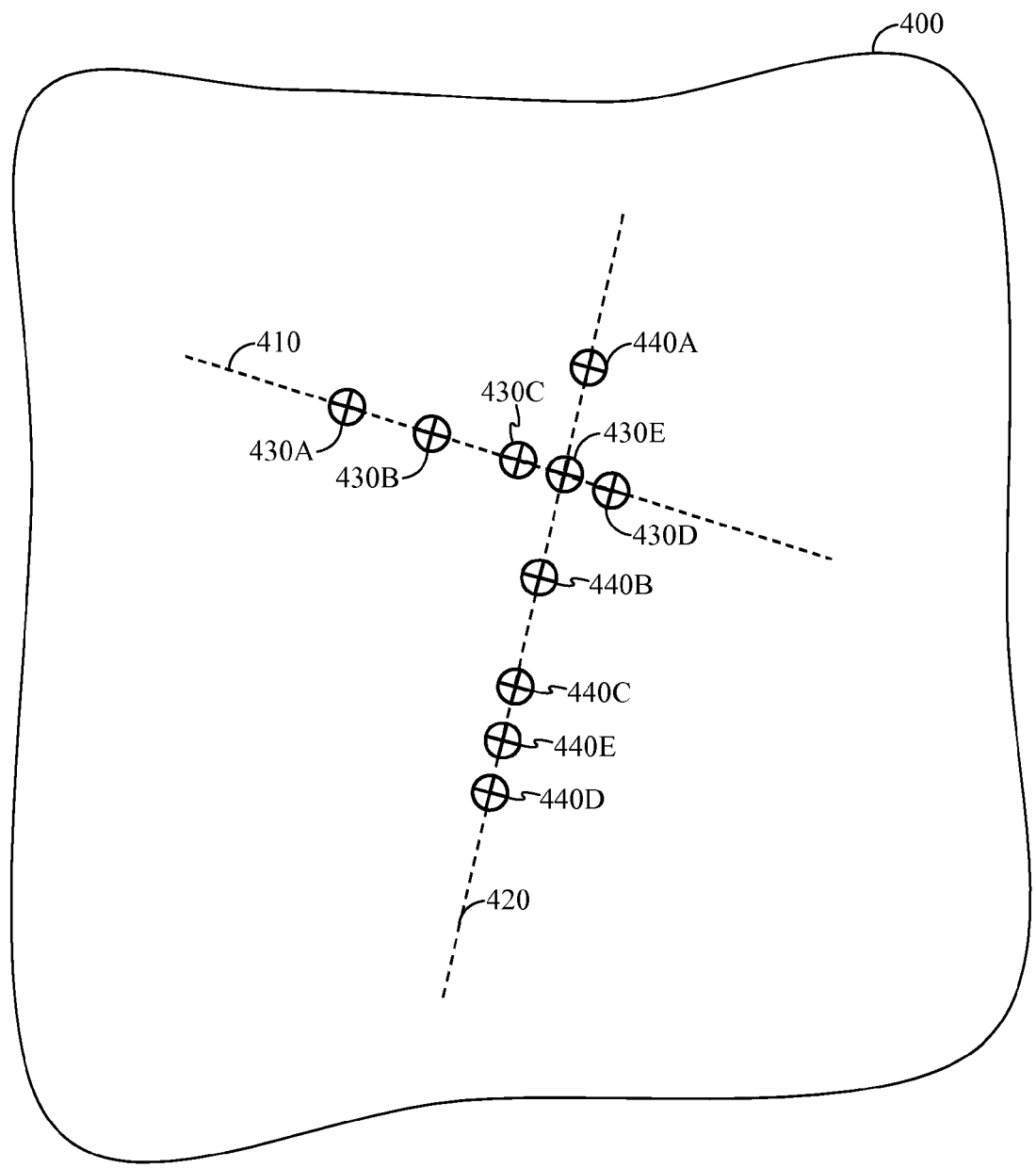
FIG. 4 is a schematic diagram showing distance measurement points on a surface for a shortest distance determination, according to one implementation.

FIG. 3 is a flow diagram of a process 300 for determining a shortest distance to a surface, and FIG. 4 is a schematic diagram showing distance measurement points on a surface 400 for a shortest distance determination, according to one implementation. A distance sensor, such as distance sensor 100 shown in FIG. 1 for example, may emit energy, such as sound and/or EM energy, sequentially toward points 430A, 430B, 430C, and 430D arranged substantially linearly along a line 410. A first point 430A and the direction along which line 410 lies may be based, at least in part, on an orientation of the distance sensor, which may be held by a user that may select such a direction. FIG. 2 may depict such a case, for example, wherein such a direction may be at least partially randomly selected since a user may hold a distance sensor manually. The particular direction of line 410 need not be of importance in process 300, as explained in detail below. At block 310, initial point 430A on line 410 may be selected and its distance measured. At block 320, a portion, such as an emitter portion, of the distance sensor may rotate through a step angle to emit energy toward a subsequent point 430B. A step angle of such a rotation, and a corresponding spacing between points 430A and 430B on surface 400 may be selected based at least in part on a desired resolution and/or accuracy of a particular process 300, as discussed in detail below. Such a step angle may comprise a constant value that is used for subsequent rotations of emitted energy until a direction of such a rotation is reversed, as at block 360 described in detail below.

Subsequently, at block 330, at least a portion of energy emitted toward point 430B may reflect back to the distance sensor, where the reflected energy may be received. A distance to point 430B may be determined based at least in part on a measured propagation time of the emitted/received energy. At block 340, a determination may be made whether the subsequently measured distance, e.g., to point 430B, is greater than the previously measured distance, e.g., to point 430A. If not, then process 300 may return to block 320 where a portion of the distance sensor may again rotate through the same step angle as for the previous rotation to direct energy toward a subsequent point 430C. Again, at block 340, a determination may be made whether the subsequently measured distance, e.g., to point 430C, is greater than the last previously measured distance, e.g., to point 430B. If not, then process 300 may again return to block 320 where the emitter portion of the distance sensor may again rotate through the same step angle as for the previous rotation to direct energy toward a subsequent point 430D. Such a process of directing energy toward a point on a surface, rotating through a step angle, directing energy toward another point on the surface, and so on may repeat each time a subsequently measured distance is less than the previously measured distance. Such a repeating process may allow the distance sensor's emission angle to approach a point along line 410 on surface 400 that is closest to the distance sensor. A measured distance to such a point may be referred to as a relative minimum since the measured distance may be the smallest value among measured distances to points along line 410. On the contrary, an indication that the distance sensor's emission angle has passed such a point on line 410 may occur if the last measured distance is greater than a previously measured distance.

In the present example illustrated in FIG. 4, a distance to point 430D, measured at block 330, is greater than the distance measured to point 430C, as determined at block 340. Accordingly, at block 350, a determination may be made as to whether the angle of rotation corresponds to a resolution limit imposed on the distance sensor, for example. If not, then a search for a shorter distance to a point on surface 400 than the distance to point 430D may be performed. Such a point corresponding to a shorter distance may be assumed to be on line 410 between points 430C and 430D. Accordingly, the emitter portion of the distance sensor may reverse its direction of rotation and reduce its step angle by half or other fraction from previous step angles, for example, as at block 360. Of course, other step angle reduction amounts are possible, and claimed subject matter is not so limited. In this fashion, a distance to a point 430E may be determined, as at block 330. At block 340, a determination may be made whether the subsequently measured distance, e.g., to point 430E, is greater than the previously measured distance, e.g., to point 430D. If so then, at block 350, a determination may be made as to whether the current angle of rotation corresponds to a resolution limit imposed on the distance sensor, for example. If not, then a search for a shorter distance to a point on surface 400 than the distance to point 430E may be performed. However, if such a resolution limit is reached, then a process to search for a closest point on surface 400 along a line 420 that is substantially orthogonal to line 410 may then be performed, as at block 370.

In a particular implementation, line 420 being substantially orthogonal to line 410 may lead to a relatively fast process to determine a closest point on surface 400, as compared to the case where line 420 is at an oblique angle to line 410, for example. Such orthogonality may provide an efficient process of measuring points on surface 400 in a trial-and-error fashion until a closest distance is determined. The process at block 370 may comprise actions similar to those of blocks 310 through 360, for example. In particular, the emitter may rotate to direct energy toward a point 440A so that a distance to this point may be determined. Continuing with the example depicted in FIG. 4, the emitter may rotate through a step angle to direct energy toward a point 440B after determining that the distance to point 440A is greater than the distance to point 430E. As described above for the process of determining distances to points 430C, 430D, and 430E, distances to points 440C, 440D, and 440E may be measured to determine a closest point on surface 400 along line 420. A measured distance to such a point may be referred to as a relative minimum since the measured distance may be the smallest value among measured distances to points along line 420. Since line 420 may include point 430E, which was determined to be the closest point on surface 400 along line 410, a closest point along line 420 may be selected as the closest point on the surface 400, within a measurement resolution limit, as at block 380. In the example depicted in FIG. 4, point 440E is the closest point.

Figure 5:
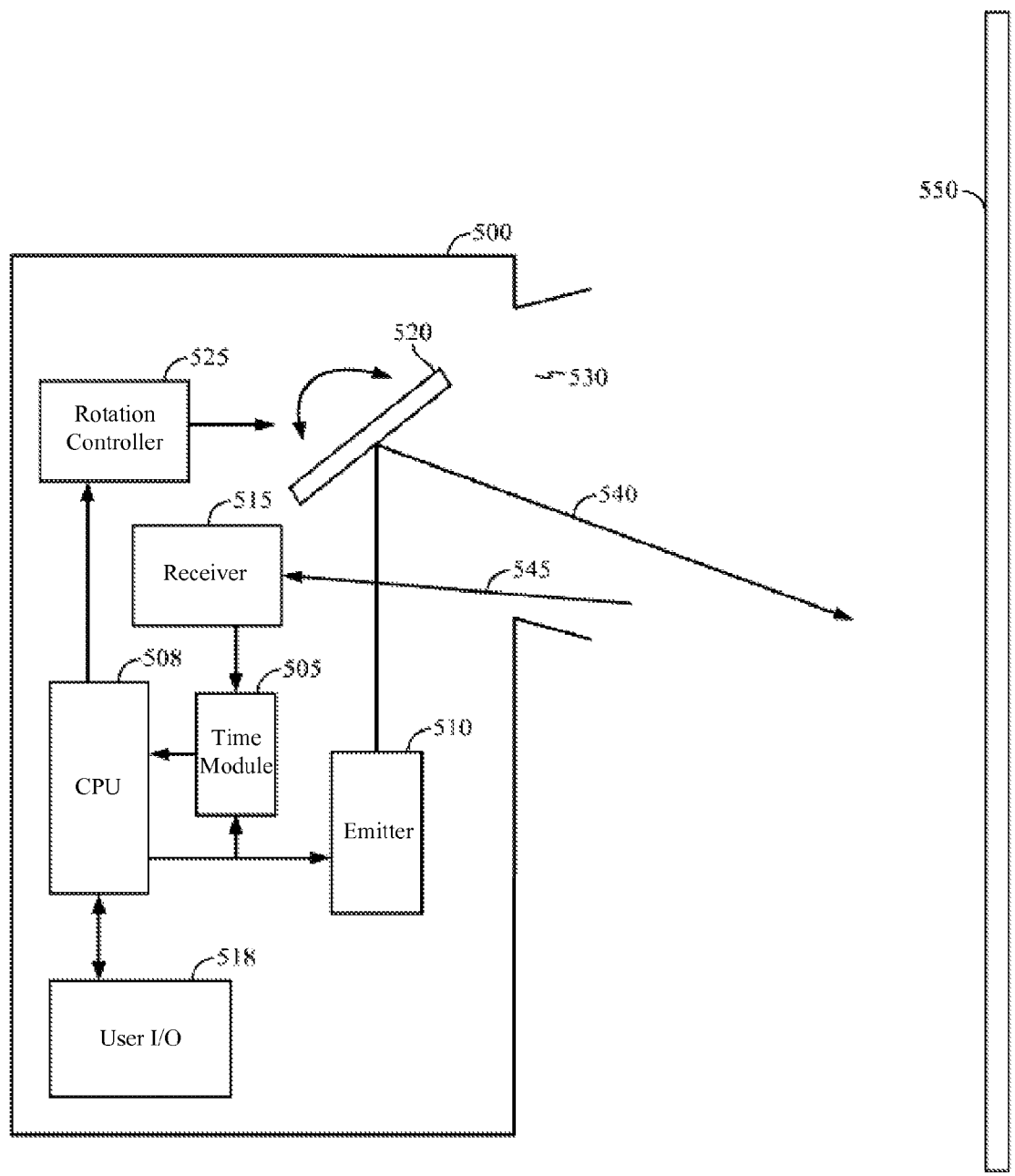
FIG. 5 is a schematic diagram showing a distance sensor for measuring distances to multiple measurement points on a surface, according to one implementation.

FIG. 5 is a schematic diagram showing a distance sensor 500 for measuring distances to multiple distance measurement points on a surface 550, according to one implementation. Upon receiving emitted energy from emitter 510, a rotatable reflector 520 may direct energy 540 via opening 530 towards various distance measurement points on surface 550. A processor 508 may transmit information to a rotation controller 525 that may send signals to rotatable reflector 520 that determine at least in part the angular position of the rotatable reflector. In one particular implementation, rotatable reflector 520 may comprise a reflector to reflect EM energy emitted by emitter 510. Such a reflector may be rotated by a stepper motor that receives signals from rotation controller 525, for example. In another particular implementation, rotatable reflector 520 may comprise a micro-reflector array to reflect EM energy emitted by emitter 510. The angle of reflection of such an array may be determined at least in part by signals from rotation controller 525 that operate on multiple micro-reflectors in the array, for example. Rotation controller 525 may operate on such an array of micro-reflectors in unison so that multiple micro-reflectors have identical reflecting angles, or individual micro-reflectors may have reflecting angles different from one another, as will be discussed below. In yet another particular implementation, rotatable reflector 520 and emitter 510 may be combined into a rotating emitter (not shown) to direct sound energy at various angles. The angle of such a rotating emitter may be determined at least in part by signals from rotation controller 525 that may operate a motor such as a stepper motor, for example. Of course, such emitters are merely examples, and claimed subject matter is not so limited.

In an implementation, rotatable reflector 520 may comprise two or more degrees of rotational freedom orthogonal from one another. For example, rotatable reflector 520 may comprise a degree of rotational freedom in the plane of FIG. 5, as shown. Additionally, rotatable reflector 520 may comprise a degree of rotational freedom perpendicular to the plane of FIG. 5 (not shown). Accordingly, rotatable reflector 520 may reflect energy 540 in one or more directions across surface 550, such as orthogonal lines 410 and 420 on surface 400 in FIG. 4, for example.

Receiver 515 may receive energy 545 reflected from surface 550 after a propagation time delay from when energy 540 was emitted from emitter 510. Such a delay may be measured by time module 505, which may monitor signals transmitted from processor 508 to emitter 510 that initiate the emitter to emit energy 540, for example. Accordingly, time module 505 may measure a time difference between when energy 540 is emitted and energy 545 is received. Of course, such methods of measuring propagation time of energy are merely examples, and claimed subject matter is not so limited. Returning to FIG. 5, user I/O 518 may provide user access and/or control to distance sensor 500 via processor 508.

In an implementation, an emitter may include a mechanically rotatable reflector capable of directing sound, light, IR and/or RF energy along multiple angles toward a surface to be measured, for example. Such a rotatable reflector may comprise a micro-reflector device, such as a micro-mirror array mounted on a semiconductor device, also known as a digital mirror device, for example. Depending on what type of energy is to be reflected, such a rotatable reflector may include various coatings and/or treatment to improve reflectance. Such a rotatable reflector may also include various reflecting-surface shapes, such as planar, spherical, parabolic, concave, convex, and so on. Such a rotatable reflector may have a relatively small form factor, allowing the rotatable reflector, among other things, to fit in a handheld device, for example. Of course, such a micro-reflector device is merely an example of a small form factor rotatable reflector, and claimed subject matter is not so limited.

Figure 6:
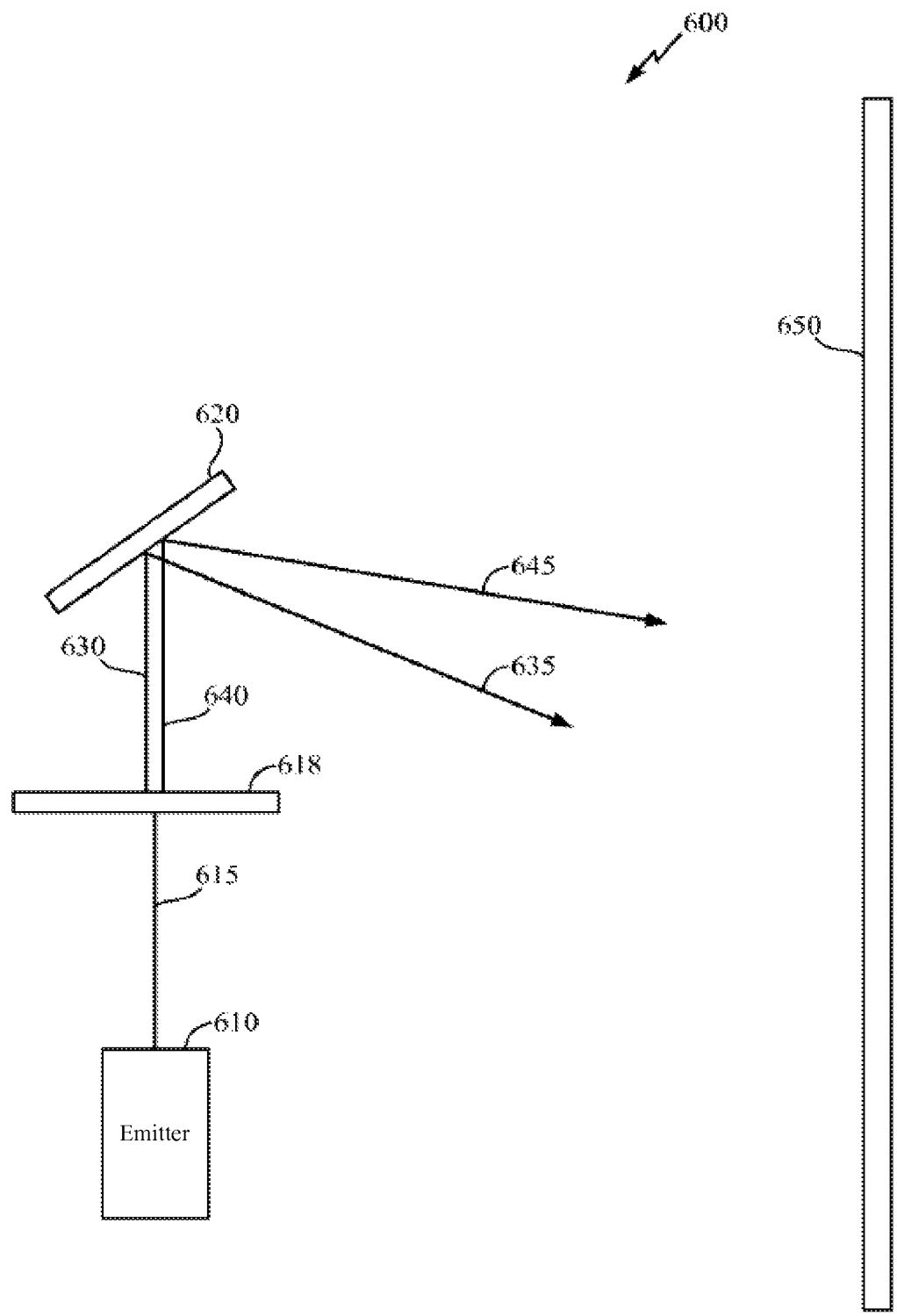
FIG. 6 is a schematic diagram showing an emitter system to emit light energy toward multiple directions simultaneously, according to one implementation.

FIG. 6 is a schematic diagram showing an emitter system 600 to emit light energy toward multiple directions at the same time, according to one implementation. Such a system may be included in a distance sensor such as distance sensor 500 shown in FIG. 5, for example. Emitter system 600 may include emitter 610 configured to emit light energy 615 comprising multiple wavelengths, such as a first wavelength and a second wavelength for example. Light energy 615 from emitter 610 may encounter wavelength splitter 618 configured to partition light energy into distinct wavelengths. Accordingly, light energy 615 may be partitioned into light beam 630 having a first wavelength and light beam 640 having a second wavelength. Micro-reflector array 620 may comprise micro-mirrors, such as those of a digital mirror device for example, whose angle may be individually set. Such partitioned light beams may travel along substantially the same paths or diverging paths, though in either case such beams may be incident on one or more portions of micro-reflector array 620.

In a particular implementation, a portion of micro-reflector array 620 may be set at a first angle while another portion may be set at a second angle, for example. As a result, light beam 630 may be reflected at a first angle leading to beam 635 and light beam 640 may be reflected at a second angle leading to beam 645. Beam 635 may be projected onto a distance measurement point on surface 650 along a first line, and beam 645 may be projected onto a distance measurement point on surface 650 along a second line orthogonal to the first line. First and second lines may be similar to orthogonal lines 410 and 420 on surface 400 in FIG. 4, for example, which may be used for process 300 in FIG. 3. In this fashion, distances to points along the first and second lines may be measured simultaneously, thus shortening a time it may take to measure a closest distance to surface 650. Multiple wavelengths and/or encoded pulses of beams 635 and 645 may allow a receiver (not shown) to distinguish a reflection from surface 650 of beam 635 from that of beam 645. Such a receiver may measure propagation time of beams 635 and 645, as discussed above. Of course, such methods of partitioning energy to distinguish among multiple energy beams reflected from a surface are merely examples, and claimed subject matter is not so limited.

In another implementation, a handheld device, such as a cellular phone, PDA, and the like, may include a size sensor to determine a distance between two point on a surface of a remote object. If the two points correspond to edges of such a remote object, then a distance between the two points may comprise a size of the object, for example. Such a size sensor may comprise a distance sensor that includes an emitter and a receiver to emit and receive sound, light, IR and/or RF energy, and a time module to determine a propagation time of the emitted energy as it travels to and from the remote surface. A size sensor may also include a special purpose processor adapted to determine distances to points on the surface and to use such determined distances to calculate a distance between two such points. Additionally, such a size sensor may have a sufficiently small form factor in order to fit in a handheld device such as a cellular phone or PDA, for example. In a particular implementation, a distance sensor may be capable of emitting sound, light, IR and/or RF energy along multiple angles. Individual angles may respectively correspond to particular distance measurement points on the remote surface. Determining distances to the remote surface along individual angles may yield multiple distance measurements. Two such measurements, for example, may be used to calculate a distance between two corresponding points on the remote surface.

Figure 7:
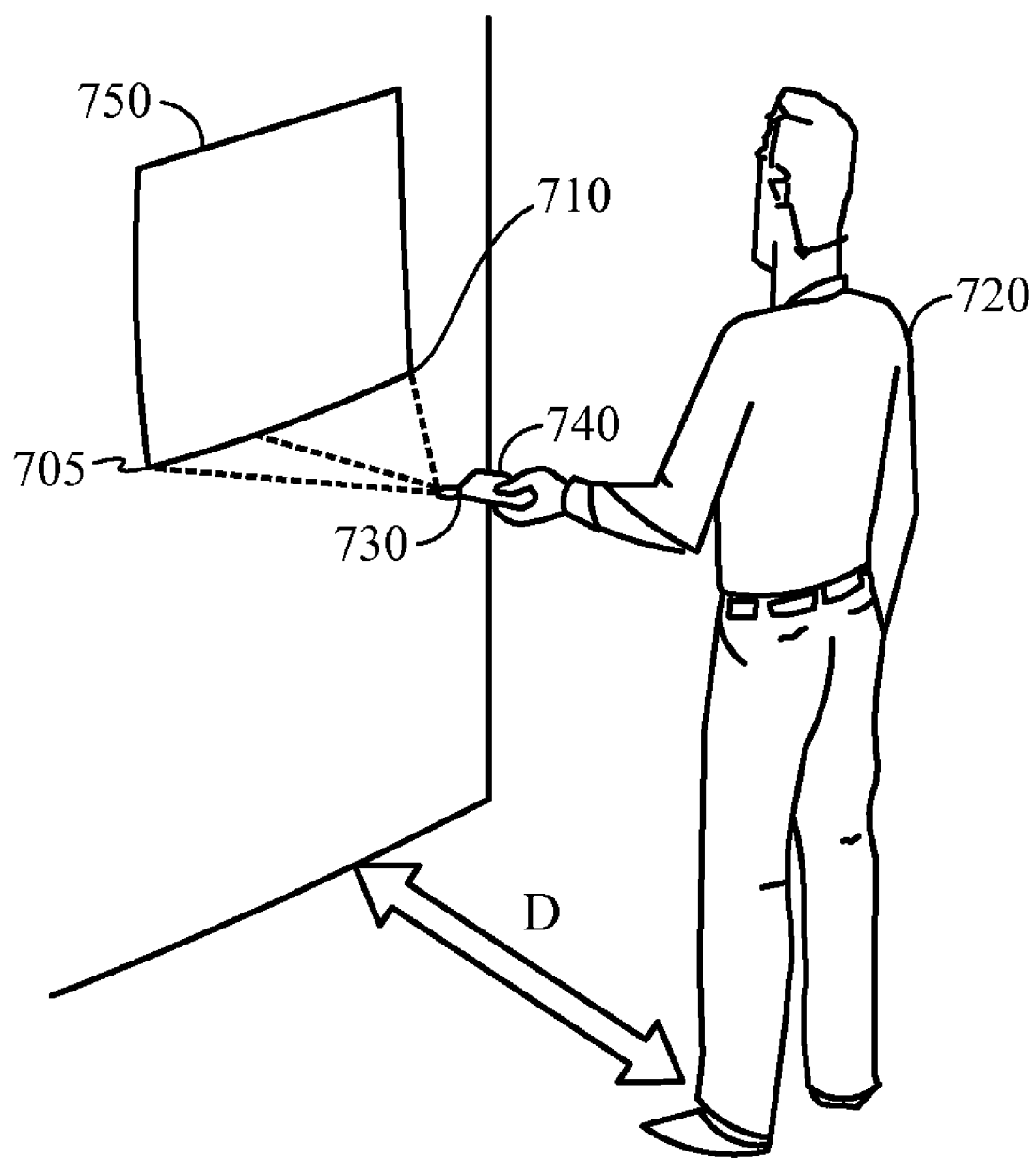
FIG. 7 is a diagram depicting a handheld device measuring several distances to a surface, according to an implementation.

FIG. 7 is a diagram depicting a user 720 holding a handheld device 740 a distance from a remote surface 750. The handheld device may include a distance sensor 730 measuring several distances to surface 750, according to an implementation. Such a distance sensor may comprise a portion of a distance sensor that is disposed in handheld device 740, such as a cell phone for example, as mentioned above. In one particular implementation, similar to distance sensor 100 shown in FIG. 1, distance sensor 730 may transmit and receive with sound energy comprising substantially directed sound waves having subsonic or supersonic frequencies. In another particular implementation, distance sensor 730 may transmit and receive with electromagnetic (EM) energy comprising RF radiation, and/or laser light having visible or IR wavelengths. Of course, such descriptions of sound and EM energy are merely examples, and claimed subject matter is not so limited. Again, similar to distance sensor 100 shown in FIG. 1, distance sensor 730 may emit such energy toward a point 705 and/or 710 on surface 750. Such energy may comprise a pulse of energy, e.g., a relatively short wave-train of sound and/or EM energy having a begin and end time. Such a pulse may be encoded, for example, to provide a means for distinguishing multiple received pulses from one another. Subsequently, energy reflected from surface 750 may travel back to distance sensor 730, where a measurement of time elapsed between emission and reception at the receiver may be performed. Such an elapsed time may be referred to as propagation time. Using knowledge of the speed of sound and/or EM energy emitted and received by the distance sensor and the measured propagation time, a distance from the distance sensor to the remote surface may be determined. As shown in FIG. 7, distance sensor 730 may be held at a skewed angle 725 relative to surface 750. For example, such an angle need not be perpendicular to remote surface 750. At such an angle, distance sensor 730 may be adapted to emit energy toward either point 705 or 710 on surface 750 without user 720 changing a position of distance sensor 730. In other words, distance sensor 730 may redirect emitted energy toward various directions without rotating handheld device 740.

Figure 8:
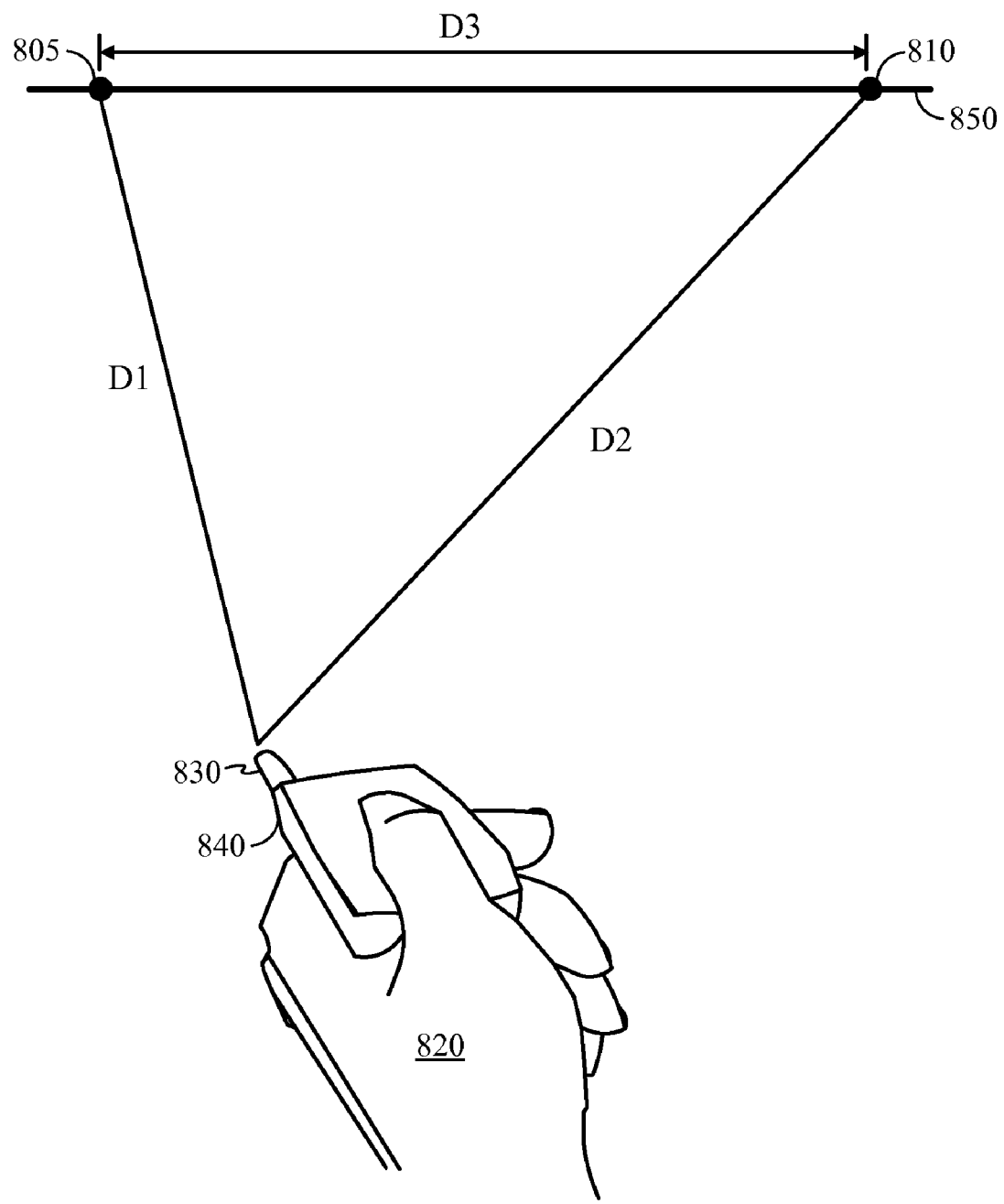
FIG. 8 is a detailed view showing a handheld device measuring several distances to a surface, according to an implementation.

FIG. 8 is a detailed view showing a handheld device 840 measuring several distances to a surface 850, according to an implementation. Handheld device 840 may comprise a cell phone, a PDA, and the like, and include a distance sensor 830. Such a sensor, as mentioned above, may have a small form factor to enable the sensor to fit in handheld device 840 As shown in FIG. 8, such a distance sensor 830 may emit sound and/or EM energy along multiple angles toward multiple distance measurement points on surface 850. In a particular implementation, distance sensor 830 may include one or more rotatable micro-reflectors mounted on a semiconductor device. Such rotatable micro-mirrors, which are explained in more detail below, may provide the small form factor mentioned above, for example. Of course, such a description of a distance sensor in conjunction with handheld device 840 is merely an example, and claimed subject matter is not so limited. In an example, a user 820 may hold handheld device 840 toward surface 850 to direct an energy beam along a distance D1 to point 805 on surface 850 to measure distance D1. Distance sensor 830 may then redirect an energy beam along distance D2 to another point 810 on surface 850 to measure a distance to surface 850 along the direction of D2. An angle 825 of such a redirection may be measured by distance sensor 830, as explained in detail below. After such a process of measuring distances D1 and D2, distance sensor 830 may calculate a distance D3 between two points 805 and 810 on surface 850. Such a calculation may involve measured distances D1 and D2 and measured angle 825. Of course, such a process involving a distance sensor is merely an example, and claimed subject matter is not so limited.

Figure 9:
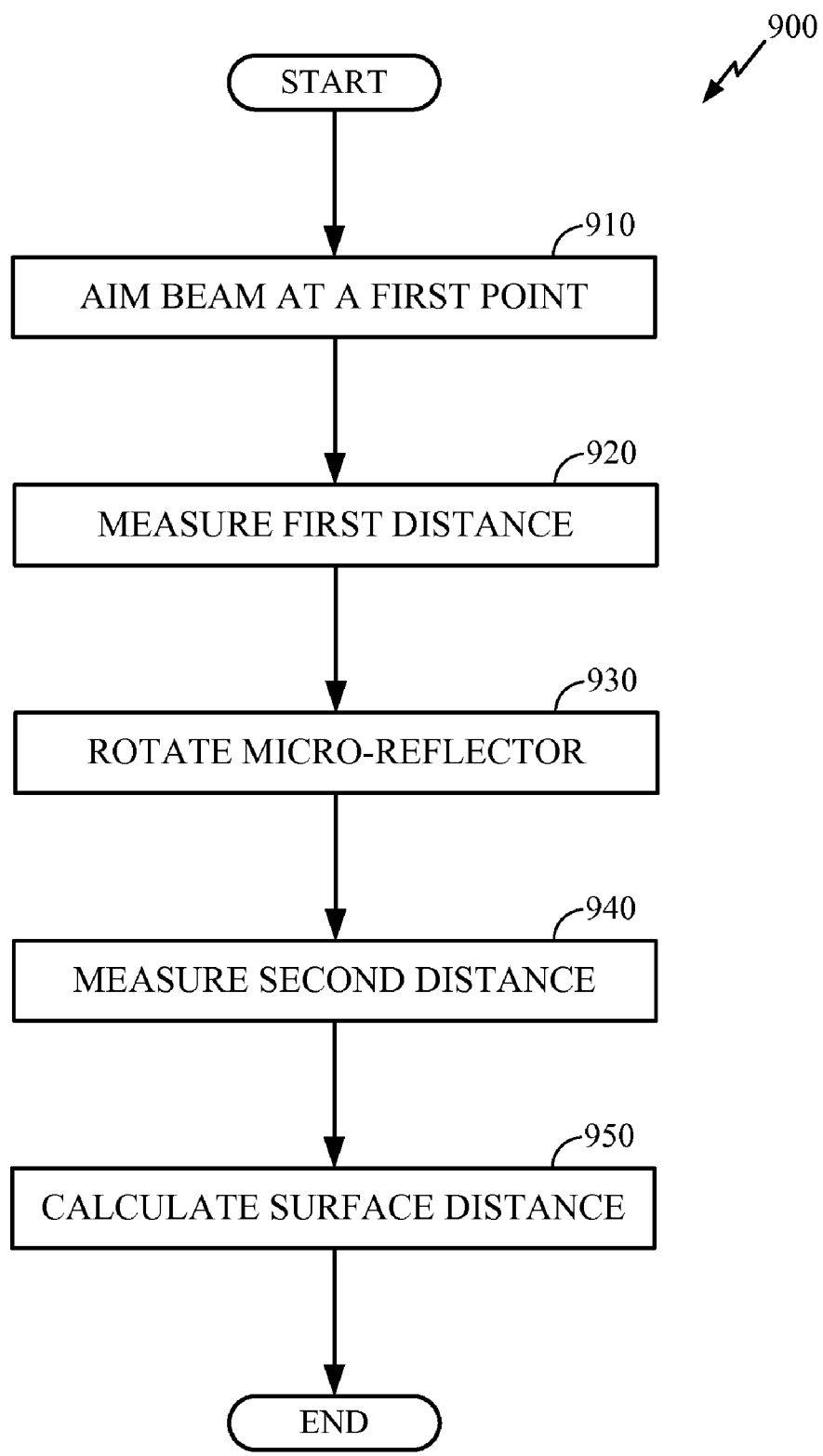
FIG. 9 is a flow diagram of a process for determining a distance on a remote surface, according to an implementation.

FIG. 9 is a flow diagram of a process 900 for determining a distance on a remote surface, according to an implementation. Returning to the implementation shown in FIG. 8, such a surface may include surface 850 for example. At block 910, a user 820 holding a handheld device 840 may direct energy toward a first point 805 on a surface. Such energy may be emitted by an emitter included in a distance sensor 830 on board the handheld device for example. As described above, the emitter may emit an energy beam toward the first point. Accordingly, at block 920, a distance D1 to the first point may be measured. In one particular implementation, user 820 may select the first point to be along an edge of an object (not shown) and subsequently select a second point to be along an opposite edge of the object in order to measure a size of the object. In another particular implementation, a user may select first and second points anywhere on a surface of an object in order to measure a distance between the two points. Returning to process 900 at block 930, distance sensor 830 may include one or more micro-reflectors (FIGS. 11 and 12) that may be rotated to redirect a measurement direction toward a second point. Such a rotation may be performed by user 820 activating one or more controls (not shown) on handheld device 840, for example. Such controls may actuate a rotation of the one or more micro-reflectors. An angle of rotation, such as angle 825 shown in FIG. 8 for example, may be measured and stored by the distance sensor. In a particular implementation, the user may hold the handheld device substantially stationary in the position used to aim the device toward the first point. At block 940, the user may measure the distance to the second point using the redirected energy. At block 950, using measured distances to first and second points and the rotation angle of the micro-reflectors subtended from the first point to the second point, a distance between the first and second points may be calculated using a geometrical relation, such as the Law of Cosines, for example.

Figure 10:
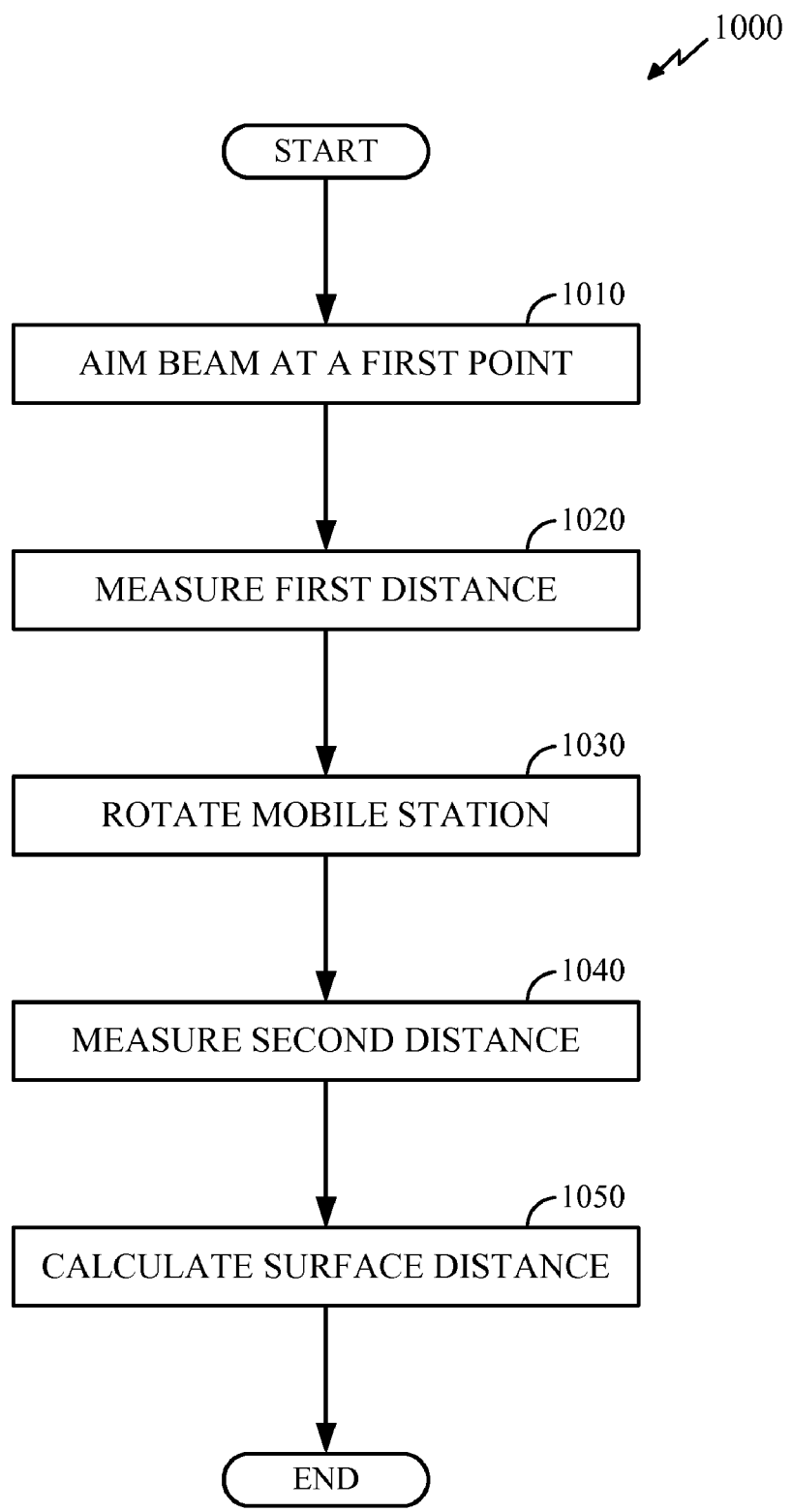
FIG. 10 is a flow diagram of a process for determining a distance on a remote surface, according to another implementation.

FIG. 10 is a flow diagram of a process 1000 for determining a distance on a remote surface, according to an implementation. Returning again to the implementation shown in FIG. 8, such a surface may include surface 850 for example. At block 1010, a user 820 holding a handheld device 840 may aim an emitter, which may be included in a distance sensor 830 on board the handheld device for example, toward a first point 805 on a surface. As described above, the emitter may emit an energy beam toward the first point. Accordingly, at block 1020, a distance D1 to the first point may be measured. At block 1030, user 820 may rotate handheld device 840 to consequently rotate an emitted energy beam toward a second point in order to measure distance D2 to the second point. In a particular implementation, distance sensor 830 may include angle and/or direction-measuring transducers, such as a clinometer and/or a compass. Using such transducers, the angle, such as angle 825, at which handheld device 840 is rotated from a direction of the first point to that of the second point may be measured. Distance sensor 830 may then store such an angle. At block 1040, the user may measure the distance to the second point using the redirected energy. At block 1050, using measured distances to first and second points and the rotation angle of the handheld device subtended from the first point to the second point, a distance between the first and second points may be calculated using a geometrical relation, such as the Law of Cosines, as mentioned above.

Figure 11:
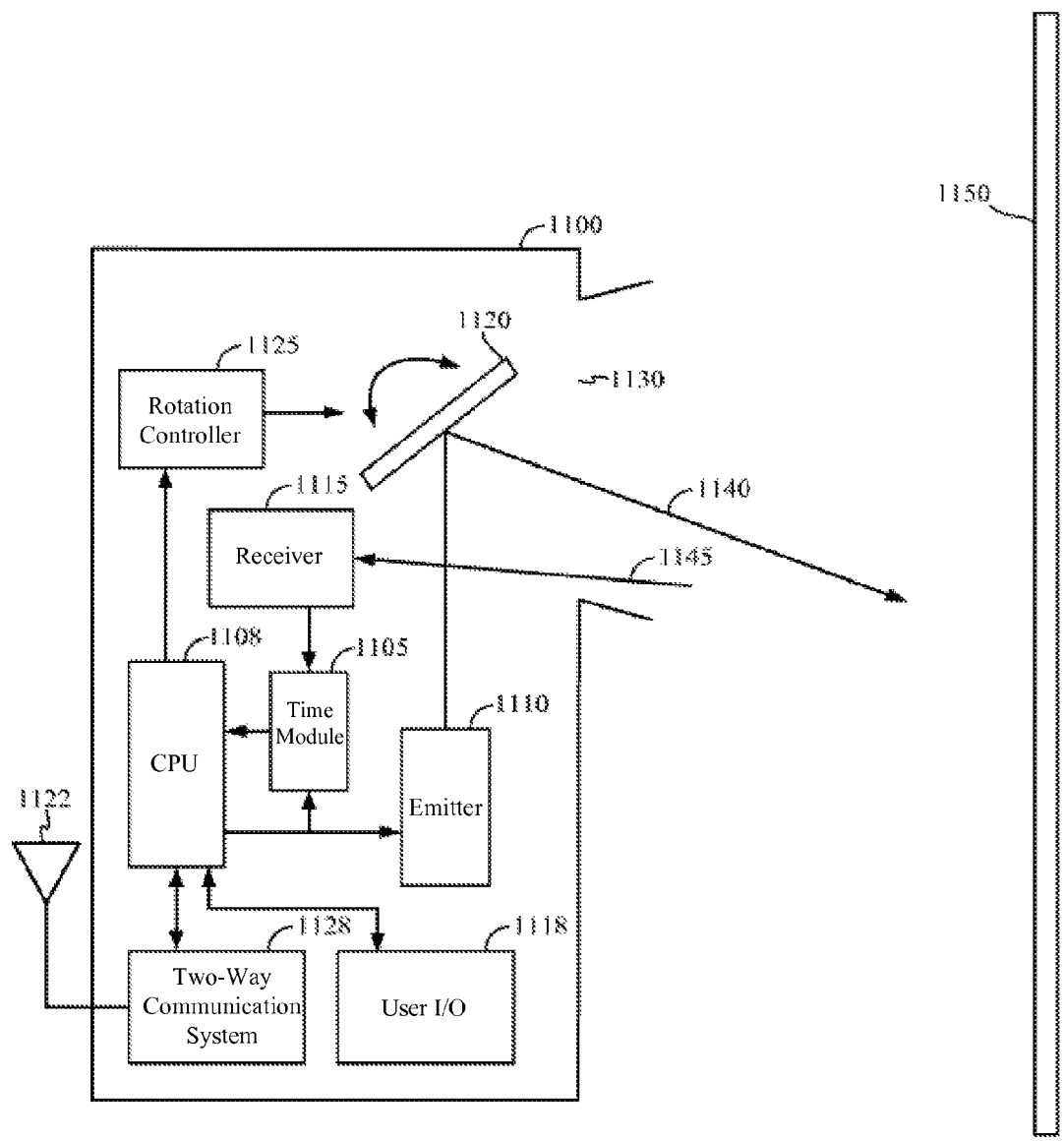
FIG. 11 is a schematic diagram showing a distance sensor for measuring distances to multiple measurement points on a surface, according to one implementation.

FIG. 11 is a schematic diagram showing a mobile device 1100 that includes a distance sensor for measuring distances to multiple distance measurement points on a surface 1150, according to one implementation. Such a mobile device may include a two-way communication system 1128, such as a cellular communication system, Bluetooth, RFID, and/or WiFi, just to name a few examples, which may transmit and receive signals via antenna 1122. Upon receiving emitted energy from an emitter 1110, a rotatable reflector 1120 may direct energy 1140 via opening 1130 toward various distance measurement points on surface 1150. A special purpose processor 1108 may transmit information to a rotation controller 1125 that may send signals to rotatable reflector 1120 that determine at least in part the angular position of the rotatable reflector. In one particular implementation, rotatable reflector 1120 may comprise a reflector to reflect EM energy emitted by emitter 1110. Such a reflector may be rotated by a stepper motor that receives signals from rotation controller 1125, for example. In another particular implementation, rotatable reflector 1120 may comprise a micro-reflector array to reflect EM energy emitted by emitter 1110. The angle of reflection of such an array may be determined at least in part by signals from rotation controller 1125 that operate multiple micro-reflectors in the array, for example. Rotation controller 1125 may operate such an array of micro-reflectors in unison so that multiple micro-reflectors have substantially identical reflecting angles, or individual micro-reflectors may have reflecting angles different from one another, as will be discussed below. In yet another particular implementation, rotatable reflector 1120 and emitter 1110 may be combined into a rotating emitter (not shown) to direct sound energy at various angles. The angle of such a rotating emitter may be determined at least in part by signals from rotation controller 1125 that may operate a motor such as a stepper motor, for example. Of course, such emitters are merely examples, and claimed subject matter is not so limited.

Receiver 1115 may receive energy 1145 reflected from surface 1150 after a propagation time delay from when energy 1140 was emitted from emitter 1110. Such a delay may be measured by a time module 1105, which may monitor signals transmitted from processor 1108 to emitter 1110 that initiate the emitter to emit energy 1140, for example. Accordingly, time module 1105 may measure a time difference between when energy 1140 is emitted and energy 1145 is received. Of course, such methods of measuring propagation time of energy are merely examples, and claimed subject matter is not so limited. Returning to FIG. 11, user I/O 1118 may provide user access and/or control to distance sensor 1100 via processor 1108. For example, such control may comprise a rotation control of rotatable reflector 1120 to redirect energy 1140 from a first point on a surface to a second point on the surface, as described above.

In an implementation, an emitter, such as emitter 1110, may include a mechanically rotatable reflector capable of directing sound, light, IR and/or RF energy along multiple angles toward a surface to be measured, for example. Such a rotatable reflector may comprise a micro-reflector device, such as a micro-mirror array mounted on a semiconductor device, also known as a digital mirror device, for example. Depending on what type of energy is to be reflected, such a rotatable reflector may include various coatings and/or treatment to improve reflectance. Such a rotatable reflector may also include various reflecting-surface shapes, such as planar, spherical, parabolic, concave, convex, and so on. Such a rotatable reflector may have a relatively small form factor, allowing the rotatable reflector, among other things, to fit in a handheld device, for example. Of course, such a micro-reflector device is merely an example of a small form factor rotatable reflector, and claimed subject matter is not so limited.

Figure 12:
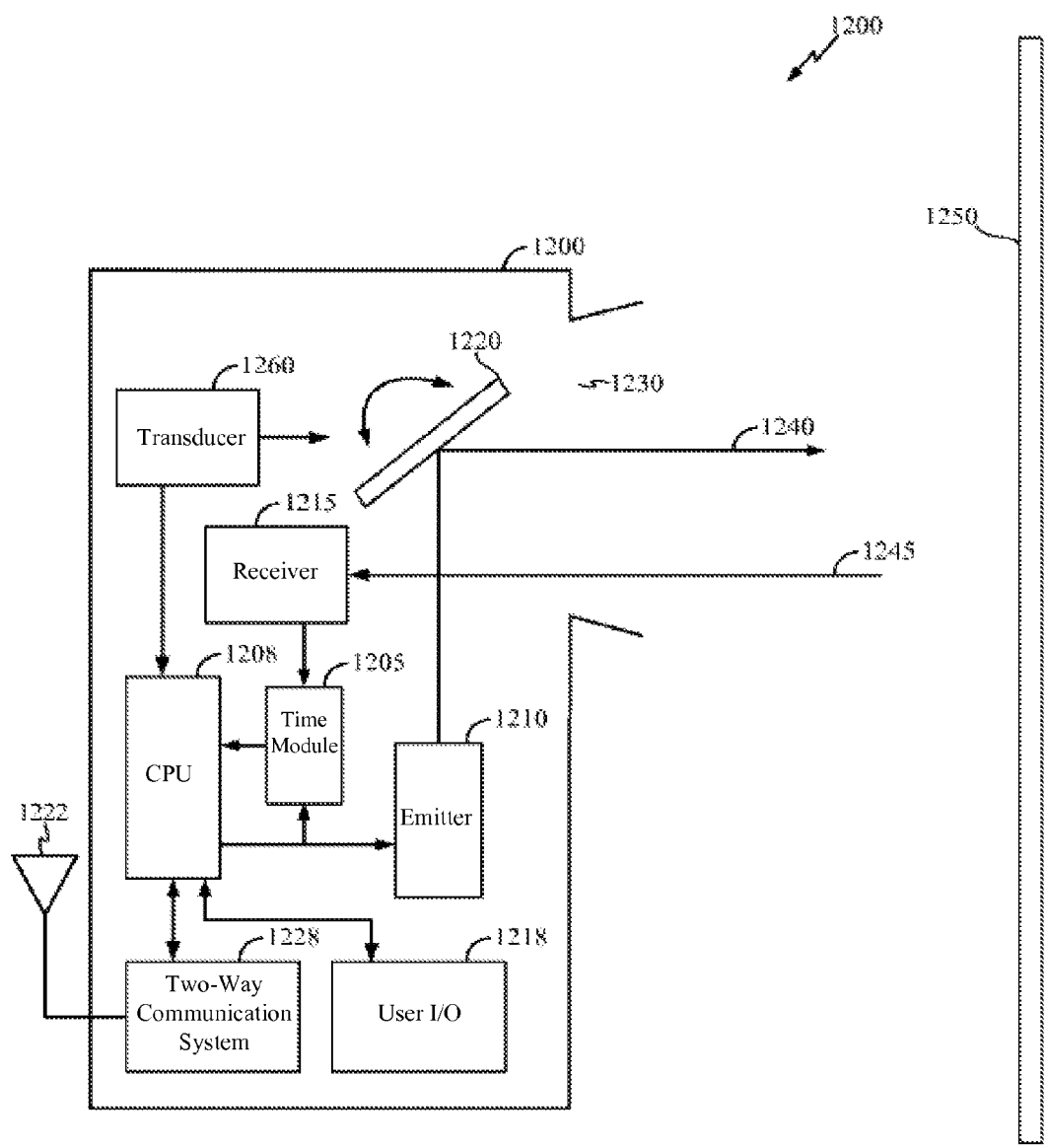
FIG. 12 is a schematic diagram showing a distance sensor for measuring a distance to a measurement point on a surface, according to one implementation.

FIG. 12 is a schematic diagram showing a mobile device 1200 that includes a distance sensor for measuring distances to multiple distance measurement points on a surface 1250, according to one implementation. Such a mobile device may include a two-way communication system 1228, such as a cellular communication system, Bluetooth, RFID, and/or WiFi, just to name a few examples, which may transmit and receive signals via antenna 1222. Upon receiving emitted energy from an emitter 1210, a reflector 1220, which may be fixed with respect to the mobile device, may direct energy 1240 via opening 1230 toward various distance measurement points on surface 1250. A special purpose processor 1208 may receive information from one or more transducers 1260 adapted to measure angles in various planes of motion. For example, transducers 1260 may comprise one or more compasses and/or clinometers. Accordingly, such information communicated from transducers 1260 to processor 1208 may comprise angles of rotation of mobile device 1200. In a particular implementation, reflector 1220 may comprise a micro-reflector array to reflect EM energy emitted by emitter 1210. Of course, such a description of a mobile device is merely an example, and claimed subject matter is not so limited.

Similar to a process described for FIG. 11, receiver 1215 may receive energy 1245 reflected from surface 1250 after a propagation time delay from when energy 1240 was emitted from emitter 1210. Such a delay may be measured by a time module 1205, which may monitor signals transmitted from processor 1208 to emitter 1210 that initiate the emitter to emit energy 1240, for example. Accordingly, time module 1205 may measure a time difference between when energy 1240 is emitted and energy 1245 is received. Of course, such methods of measuring propagation time of energy are merely examples, and claimed subject matter is not so limited. Returning to FIG. 12, user I/O 1218 may provide user access and/or control to distance sensor 1330 via processor 1208.

Figure 13:
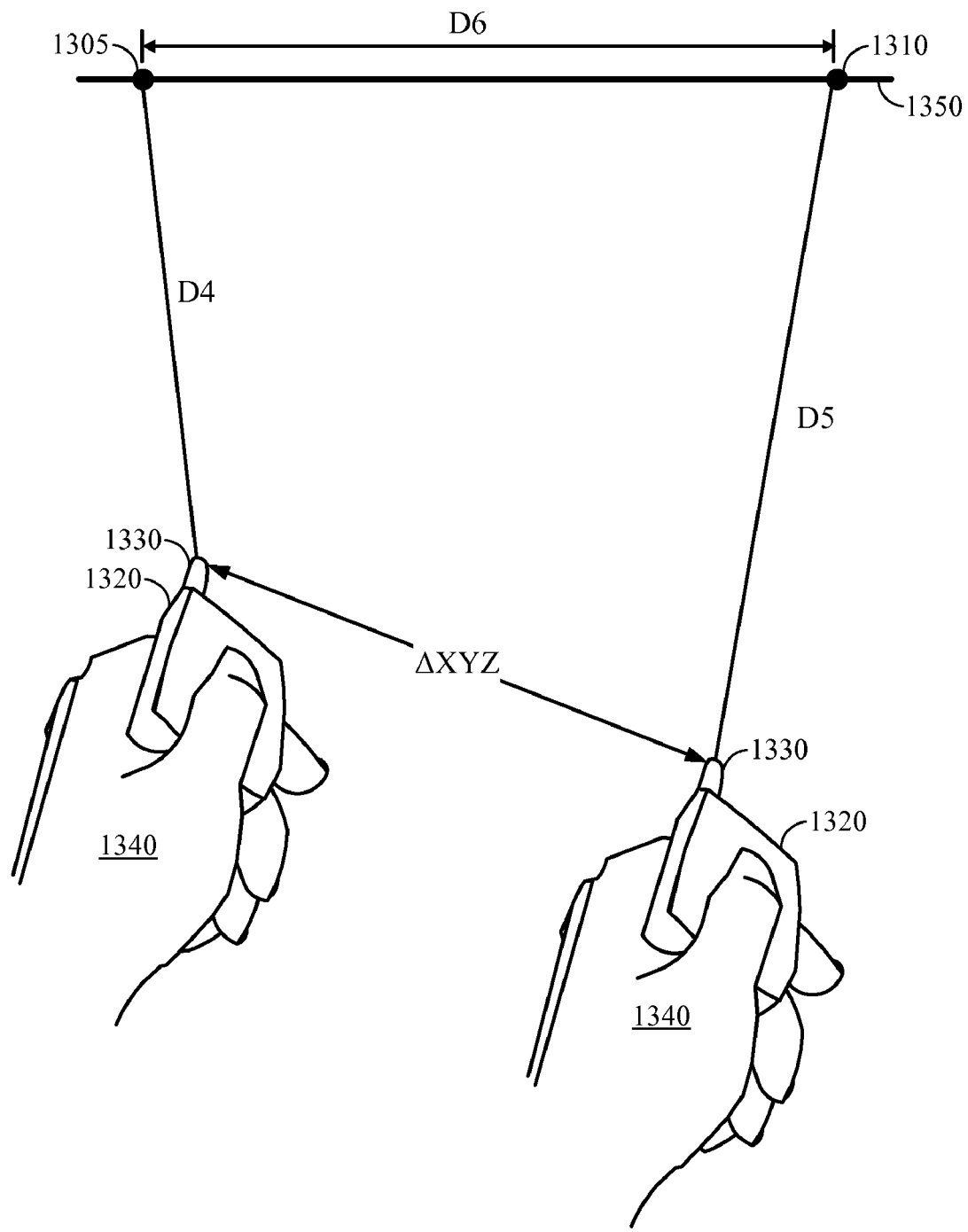
FIG. 13 is a diagram depicting a non-stationary handheld device measuring several distances to a surface, according to an implementation.

FIG. 13 is a diagram depicting a non-stationary handheld device 1340 measuring several distances to a surface 1350, according to an implementation. Such movement of a handheld device may arise, for example, from the time when a distance to a first point 1305 on a surface is measured to the time when a distance to a second point 1310 on the surface is measured. Perhaps a user's unsteady hand holding the handheld device results in such a movement, and/or a user may be in motion while performing distance measurements. As for the implementation shown in FIG. 8, a handheld device 1340 may comprise a cell phone, a PDA, and the like, and include a distance sensor 1330. Such a sensor, as mentioned above, may have a small form factor to enable the sensor to fit in handheld device 1340. Such a distance sensor 230 may emit sound and/or EM energy along multiple angles toward multiple distance measurement points on surface 1350, as described above.

In a particular implementation, distance sensor 1330 may include one or more rotatable micro-reflectors mounted on a semiconductor device. Such rotatable micro-mirrors, explained above, may provide the small form factor mentioned above, for example. Of course, such a description of a distance sensor in conjunction with handheld device 1340 is merely an example, and claimed subject matter is not so limited. In an example, a user 1320 may hold handheld device 1340 toward surface 1350 to direct an energy beam along a distance D4 to point 1305 on surface 1350 to measure distance D4. Distance sensor 1330 may then redirect an energy beam along distance D5 to another point 1310 on surface 1350 to measure a distance to surface 1350 along the direction of D5. In another implementation, user 1320 may redirect the energy beam to another point 1310 by rotating handheld device 1340, wherein handheld device need not include a rotatable reflector, for example. An angle of such a redirection may be measured by angle and/or direction-measuring transducers, such as a clinometer and/or a compass, which handheld device 1340 may include. In other words, such transducers may measure the angle at which handheld device 1340 is rotated from a direction of the first point to that of the second point. Distance sensor 1330 may then store such an angle.

Handheld device 1340 may be adapted to measure its position using various positioning systems, including a satellite positioning system (SPS), such as the Global Positioning System (GPS), the Wide Area Augmentation System (WAAS), and the Global Navigation Satellite System (GLONASS), for example, which may provide position, velocity, and/or time information. In a particular implementation, position information may be provided to handheld device 1340 by acquisition of SPS signals or signals from positioning technologies other than SPS, such as WiFi signals, Bluetooth, RFID, Ultra-wideband (UWB), Wide Area Network (WAN), digital TV, and/or cell tower ID, just to name a few examples. Such signals may be received via antenna 1222 shown in FIG. 12, for example. Accordingly, handheld device 1340 may be adapted to measure a position displacement ΔXYZ from a position where D4 is measured to a position where D5 is measured. After such a process of measuring distances D4 and D5, ΔXYZ, and the angle of redirection from first point 1305 to second point 1310, distance sensor 1330 may calculate a distance D6 between two points 1305 and 1310 on surface 1350. Of course, such a process involving a distance sensor is merely an example, and claimed subject matter is not so limited.

Methodologies described herein may be implemented by various means depending upon applications according to particular features and/or examples. For example, such methodologies may be implemented in hardware, firmware, software, and/or combinations thereof In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or software implementation, methodologies may be implemented with modules (e.g., procedures, functions, and so on) that perform the functions described herein. Any machine-readable medium tangibly embodying instructions may be used in implementing the methodologies described herein. For example, software codes that represent electronic signals, such as digital electronic signals, may be stored in a memory, for example the memory of a mobile station, and executed by a specialized processor, such as processors 508 or 1108 in FIG. 5 or 11, respectively. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

In one or more exemplary embodiments, the functions described may be implemented in hardware, software, firmware, or any combination thereof If implemented in software, the functions may be stored as one or more instructions or code that represent signals on a computer-readable medium. Computer-readable media includes physical computer storage media. Transmission media includes physical transmission media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
   rotating a rotatable micro-reflector in a first direction to direct energy toward a remote surface, said rotatable micro-reflector disposed in a mobile device, wherein said rotating is relative to said mobile device;
   while rotating the rotatable micro-reflector in the first direction, measuring distances to said remote surface sequentially at different degrees of rotation based at least in part on reflected energy from said remote surface resulting from said directed energy; and
   upon determining that a current measured distance exceeds a previous measured distance, reversing a direction of the rotation such that the rotatable micro-reflector is rotated in a second direction.

2. The method of claim 1, further comprising:
   measuring a distance between a first point and a second point on said remote surface based at least in part on an angle of rotation of said rotatable micro-reflector and said reflected energy.

3. The method of claim 2, wherein said measuring said distance between said first and second points further comprises:
   rotating said rotatable micro-reflector to direct energy toward said first point;
   determining a first distance to said first point;
   rotating said rotatable micro-reflector through a first angle to project energy toward said second point;
   electronically determining and storing said first angle;
   determining a second distance to said second point; and
   calculating said distance between said first point and said second point using values of said first distance, said second distance, and said first angle.

4. The method of claim 1, wherein said rotatable micro-reflector is mounted on a semiconductor device.

5. The method of claim 3, wherein said determining said first angle is performed using a clinometer and/or a compass disposed in said mobile device.

6. The method of claim 1, further comprising:
   selecting user controls disposed on said mobile device to rotate said rotatable micro-reflector.

7. The method of claim 1, wherein said rotating is in response to selecting user controls disposed on said mobile device.

8. The method of claim 1, wherein said energy comprises sound waves.

9. The method of claim 1, wherein said energy comprises light waves.

10. The method of claim 2, wherein said calculating said distance between said first point and said second point further uses positional displacement values.

11. The method of claim 10, wherein said positional displacement values are determined based, at least in part, on received radio frequency (RF) signals that represent position information.

12. The method of claim 11, wherein said RF signals comprise satellite positioning system signals and/or land-based beacons.

13. The method of claim 1, further comprising:
    determining a distance to a point on said remote surface closest to said mobile device based at least in part on said reflected energy.

14. The method of claim 13, wherein said determining said distance to said point on said remote surface closest to said mobile device further comprises:
    rotating said rotatable micro-reflector to direct energy toward a first set of points arranged linearly on said remote surface;
    determining distances to individual points of said first set of points;
    selecting a relative minimum value among said determined distances to said individual points of said first set of points;
    rotating said rotatable micro-reflector to project energy toward a second set of points arranged linearly orthogonal to said first set of points on said surface, wherein said second set of points includes a point corresponding to said relative minimum value;
    determining distances to individual points of said second set of points; and
    selecting a relative minimum value among said determined distances to individual points of said second set of points as a shortest distance to said remote surface.

15. The method of claim 14, wherein said determining distances to individual points of said first and second set of points further comprises:
    measuring propagation times of energy to and from said individual points of first and second set of points.

16. The method of claim 15, wherein said rotating said rotatable micro-reflector is performed sequentially for said individual points of said multiple points.

17. The method of claim 16, wherein the reversing step is performed in response to:
    an increase in a subsequently measured propagation time.

18. A device comprising:
    a rotatable micro-reflector to direct energy toward a remote surface, wherein said rotating is relative to said device; and
    a processor to measure, while the micro-reflector is rotating in a first direction, distances to said remote surface sequentially at different degrees of rotation based at least in part on reflected energy from said remote surface resulting from said directed energy,
    wherein the rotatable micro-reflector is configured to reverse a direction of the rotation such that the rotatable micro-reflector is rotated in a second direction in response to the processor determining that a current measured distance exceeds a previous measured distance.

19. The device of claim 18, wherein said processor is adapted to measure a distance between a first point and a second point on said remote surface based at least in part on an angle of rotation of said rotatable micro-reflector and said reflected energy.

20. The device of claim 18, wherein said rotatable micro-reflector is mounted on a semiconductor device.

21. The device of claim 19, further comprising a clinometer and/or a compass to measure said angle of rotation.

22. The device of claim 18, further comprising user controls to rotate said rotatable micro-reflector.

23. The device of claim 18, wherein said energy comprises sound waves.

24. The device of claim 18, wherein said energy comprises light waves.

25. The device of claim 18, wherein said processor is adapted to determine a distance to a point on said remote surface closest to said device based at least in part on said reflected energy.

26. A non-transitory computer-readable medium comprising machine-readable instructions stored thereon which, when executed by a computing platform, are adapted to enable said computing platform to:
rotate a rotatable micro-reflector in a first direction to direct energy toward a remote surface, said rotatable micro-reflector disposed in a mobile device, wherein said rotating is relative to said mobile device;
while rotating the rotatable micro-reflector in the first direction, measure distances to said remote surface sequentially at different degrees of rotation based at least in part on reflected energy from said remote surface resulting from said directed energy; and
upon determining that a current measured distance exceeds a previous measured distance, reverse a direction of the rotation such that the rotatable micro-reflector is rotated in a second direction.

27. The non-transitory computer-readable medium of claim 26, wherein said instructions, when executed by said computing platform, are further adapted to enable said computing platform to:
measure a distance between a first point and a second point on said remote surface based at least in part on an angle of rotation of said rotatable micro-reflector and said reflected energy.

28. The non-transitory computer-readable medium of claim 27, wherein said instructions, when executed by said computing platform, are further adapted to enable said computing platform to:
rotate said rotatable micro-reflector to direct energy toward said first point;
determine a first distance to said first point;
rotate said rotatable micro-reflector through a first angle to project energy toward said second point;
electronically determine and storing said first angle;
determine a second distance to said second point; and
calculate said distance between said first point and said second point using values of sail first distance, said second distance, and said first angle.

29. The non-transitory computer-readable medium of claim 26, wherein said rotatable micro-reflector is mounted on a semiconductor device.

30. The non-transitory computer-readable medium of claim 26, wherein said energy comprises sound waves.

31. The non-transitory computer-readable medium of claim 26, wherein said energy comprises light waves.

32. The non-transitory computer-readable medium of claim 26, wherein said instructions, when executed by said computing platform, are further adapted to enable said computing platform to:
determine a distance to a point on said remote surface closest to said mobile device based at least in part on said reflected energy.

33. The non-transitory computer-readable medium of claim 32, wherein said instructions, when executed by said computing platform, are further adapted to enable said computing platform to:
rotate said rotatable micro-reflector to direct energy toward a first set of points arranged linearly on said remote surface;
determine distances to individual points of said first set of points;
select a relative minimum value among said determined distances to said individual points of said first set of points;
rotate said rotatable micro-reflector to project energy toward a second set of points arranged linearly orthogonal to said first set of points on said surface, wherein said second set of points includes a point corresponding to said relative minimum value;
determine distances to individual points of said second set of points; and
select a relative minimum value among said determined distances to individual points of said second set of points as a shortest distance to said remote surface.

34. The non-transitory computer-readable medium of claim 33, wherein said instructions, when executed by said computing platform, are further adapted to enable said computing platform to:
measure propagation times of energy to and from said individual points of first and second set of points.

35. The non-transitory computer-readable medium of claim 34, wherein said instructions, when executed by said computing platform, are further adapted to enable said computing platform to:
reverse the direction of the rotation of said rotating said rotatable micro-reflector in response to an increase in a subsequently measured propagation time.

36. An apparatus comprising:
means for rotating a rotatable micro-reflector to direct energy toward a remote surface, said rotatable micro-reflector disposed in a mobile device, wherein said rotating is relative to said mobile device; and
means for measuring, while the micro-reflector is rotating in the first direction, distances to said remote surface sequentially at different degrees of rotation based at least in part on reflected energy from said remote surface resulting from said directed energy,
wherein the means for rotating is configured to reverse a direction of the rotation such that the rotatable micro-reflector is rotated in a second direction in response to the means for measuring determining that a current measured distance exceeds a previous measured distance.

37. The method of claim 1, further comprising:
after reversing the direction of the rotation, continuing to measure to the remote surface sequentially at different degrees of rotation while rotating the rotatable micro-reflector in the second direction.

38. The method of claim 37, wherein the measurements made while rotating the rotatable micro-reflector in the second direction are associated with a smaller step-size between successive measurements as compared to the measurements made while rotating the rotatable micro-reflector in the first direction.

* * * * *